United States Patent [19]
Noda et al.

[11] 3,958,582
[45] May 25, 1976

[54] HIGH-TEMPERATURE HEAT-INSULATING STRUCTURE

[75] Inventors: Fumiyoshi Noda, Toyota; Yukihisa Takeuchi, Aichi, both of Japan

[73] Assignees: Toyota Jidosha Kogyo Kabushiki Kaisha, Toyota; Nippondenso Co., Ltd., Kariya, both of Japan

[22] Filed: Feb. 20, 1974

[21] Appl. No.: 443,985

[30] Foreign Application Priority Data
Feb. 26, 1973  Japan.................................. 48-22923

[52] U.S. Cl. ............................... 138/149; 106/85; 106/DIG. 2; 181/61; 264/262; 252/62
[51] Int. Cl. ...................... C04b 35/18; F16l 59/14
[58] Field of Search ........... 138/149, 144, 141, 148; 264/2, 262, 333; 181/61, 62; 60/272, 273, 282, 324; 106/85, 86, DIG. 2; 252/62

[56] References Cited
UNITED STATES PATENTS

| | | | |
|---|---|---|---|
| 2,450,952 | 10/1948 | Greger | 106/85 |
| 2,747,994 | 5/1956 | Hoopes | 106/85 |
| 3,030,218 | 4/1962 | Robinson | 106/DIG. 2 |
| 3,042,578 | 7/1962 | Denning | 106/DIG. 2 |
| 3,167,439 | 1/1965 | Vukasovich et al. | 106/85 |
| 3,204,723 | 9/1965 | Sunday | 252/62 |
| 3,227,241 | 1/1966 | Matton | 181/62 |
| 3,352,814 | 11/1967 | Collins et al. | 106/85 |
| 3,445,253 | 5/1969 | Lee | 252/62 |
| 3,511,674 | 5/1970 | Harris et al. | 106/85 |
| 3,552,445 | 1/1971 | Andrews | 138/149 |
| 3,623,938 | 11/1971 | Jenkins | 252/62 |
| 3,658,564 | 4/1972 | Gerow et al. | 106/DIG. 2 |
| 3,730,744 | 5/1973 | Yovorsky | 106/85 |

*Primary Examiner*—Robert I. Smith
*Attorney, Agent, or Firm*—Brisebois & Kruger

[57] ABSTRACT

A high-temperature heat-insulating structure having a ceramic heat-insulating layer fired at a high temperature. The ceramic layer is made from a paste prepared by mixing an aqueous aluminum phosphate solution with foamable perlite particles or by mixing an aqueous monoaluminum phosphate $Al_2O_3 \cdot 3P_2O_5 \cdot 6H_2O$ solution with foamable perlite particles and ceramic fiber.

8 Claims, 6 Drawing Figures

WATER

PRIMARY PHOSPHORIC ALUMINIUM
$Al_2O_3 \cdot 3P_2O_5 \cdot 6H_2O$

FOAMABLE PERLITE +CERAMICFIBER

HIGH-TEMPERATURE HEAT-INSULATING STRUCTURE

BACKGROUND OF THE INVENTION

Conventionally, when a heat-insulating structure is used with an automobile or an autobike and subjected to vibration at a temperature of more than 500°C, a ceramic fiber has been used or the method of forming a heat-insulating layer by applying a foamable paste to a heat insulating member and foaming the paste has been adopted.

In a heat-insulating structure using a ceramic fiber, a portion of the structure becomes pulverized after a long period of use with vibration, and cavities are formed in the heat-insulating layer which impair its heat-insulating properties.

Also, in the case of the heat-insulating layer of a manifold reactor, when a ceramic fiber is used, thermal stresses are repeatedly applied due to a temperature variation and the welded portions of the steel structure which hold the heat-insulating layer are broken away and ceramic fibers are sucked through the broken portions into the exhaust gas. This leads to various problems, such as the locking of a bypass valve for the catalytic converter or a valve for the exhaust gas recirculator (E G R).

Also, in the case where a heat-insulating layer is formed by applying a foamable paste to an insulating member and foaming the paste, the layer is subject to peeling when subjected to vibration, with resultant degradation of its heat-insulating properties. While there is a known heat-insulating structure similar to those according to the present invention, which is made by introducing a ceramic paste into an insulating structure (comprising spaced steel walls) and then drying and firing to solidify the ceramic, the ceramic paste is of a low fluidity and thus is incapable of forming a uniform insulating layer when the structure is complicated and the insulating layer is thin, as in the case of an exhaust gas purifier for an automobile. Also, this type of insulating member has a high specific gravity and relatively poor heat insulating properties.

SUMMARY OF THE INVENTION

It is an object of this invention to provide a light vibration-resistant heat-insulating structure which is adapted to be used with an exhaust pipe, a manifold reactor, a catalytic converter, or the like, of an automobile.

BRIEF DESCRIPTION OF THE INVENTION

Figure 1:
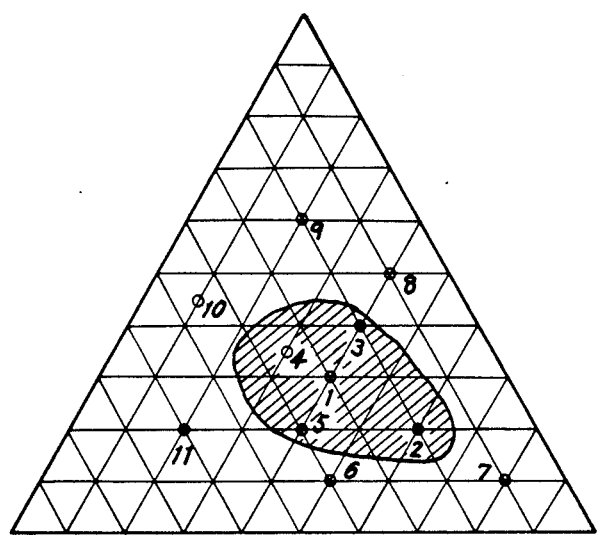
FIG. 1 is a composition diagram of a three-constituent system for manufacturing a high-temperature heat-insulating structure according to the present invention.

In the embodiments shown in the drawings, reference numeral 1 denotes an engine, 2 a manifold reactor, 3 a double-walled exhaust pipe, 4 a premuffler, 5 a catalytic converter, 6 a main muffler, 7 a flange, 8 a bolt hole, 9 a heat-insulating layer, and 10 a catalytic layer. The characters a and b indicate outer and inner cylinders respectively.

The object of the invention is to provide a vibration-resistant light heat-insulating structure which is made by introducing a highly fluid paste into various heat-insulating structures uniformly, and expanding and simultaneously solidifying the paste by heat, while causing the heat-insulating layer to adhere rigidly to said structure, which may be an exhaust pipe, manifold reactor, catalytic converter, or the like of an automobile.

In producing the heat-insulating structure according to the present invention, a paste is prepared by mixing a perlite foamed at a high temperature with an aqueous monoaluminum phosphate solution or adding a ceramic fiber to it. When forming the paste its effects are enhanced by adding an expansion restrainer and a reaction accelerator.

This paste is introduced between the walls of a double-walled structure having an inner and outer cylinder in any suitable way as by applying pressure or suction, and is fired at a high temperature after heat drying below a temperature of 500°C.

Table 1 shows the heat-resisting temperatures, vibration-resisting property, filling characteristic, and effectiveness as a heat-insulator of each of the structures which are produced by varying the mixing ratio between the water, monoaluminum phosphate and foamable perlite + ceramic fiber. The said ceramic fiber "Kaswool milled fiber" obtainable from Isorite Kogyo Company comprises 45.9% of $Al_2O_3$, 51.9% of $SiO_2$ such impurities as $Fe_2O_3$, $TiO_2$ and $NO_2O$, having a diameter of $2.8\mu$ and a length of less than 5mm.

In Table 1, foamable perlite and ceramic fiber were used in the ratio of 1:1 by weight. The term "heat-resisting temperature" means a temperature at which the rate of volumetric contraction is not more than 1% at firing for 5 consecutive hours. With respect to vibration-resistance, compositions which stand the test of vibration at 90 Hz, at ±45G for 5 consecutive hours are designated ⊚, compositions which stand the test of vibration at 90 Hz, at ±20G for 5 consecutive hours are designated O, and compositions which disintegrate when subjected to the above conditions are designated x.

Figure 3:
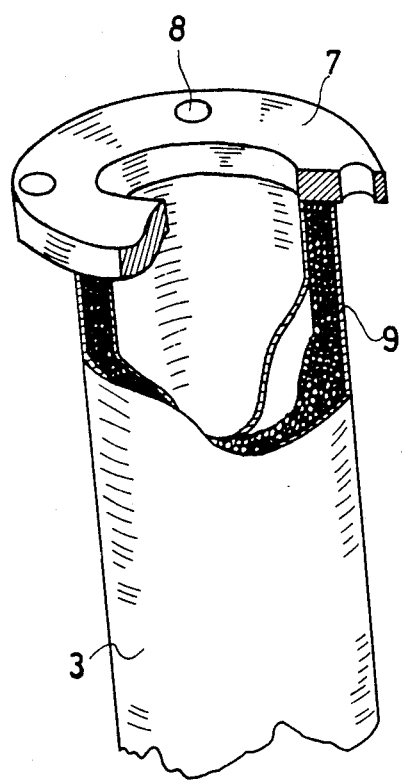
FIG. 3 is a perspective view, partially broken away, of an exhaust pipe.

Also, a straight double-walled pipe as shown in FIG. 3, which is 300 mm long, and in which the inner diameter of its outer cylinder is 52 mm and the outer diameter of its inner cylinder 36 mm, (each cylinder being 1.5 mm in thickness and the heat-insulating layer being 8 mm in thickness) was used for testing purposes.

The filling characteristic was determined from the difficulty of filling a manifold reactor, and was divided into the following three stages: a composition which is easy to introduce into the vessel is designated ⊚; a composition which may be introduced into the vessel with normal difficulty is designated O, and a composition which is hard to introduce into the vessel is designated x.

The effectiveness as a heat-insulator is indicated by ⊚, when the thermal conductivity is less than 0.15 kcal/m Hr°C at a temperature of 800°C, designated o when the thermal conductivity is 0.15 through 0.20 kcal/m Hr°C and designated x when the thermal conductivity is more than 0.20 kcal/m Hr°C.

Figure 2:
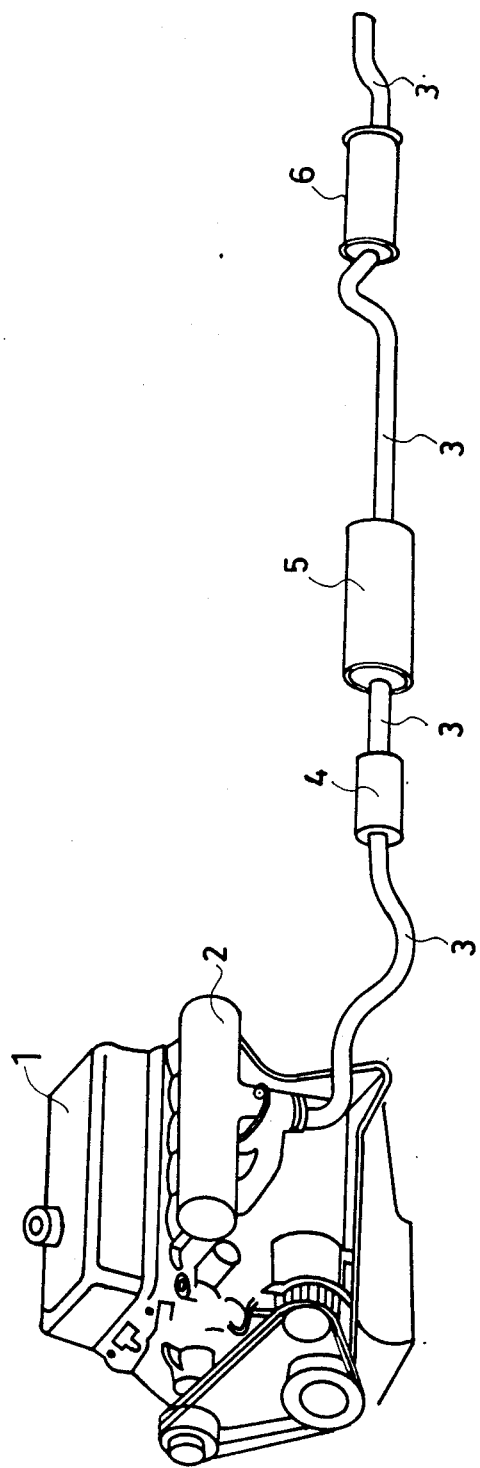
FIG. 2 is a diagramatic view of the exhaust system of an automobile.

As to the overall appraisal, a composition which has a high utility is designated ⊚ , a composition which has a normal utility is designated o , and a composition which has no utility is designated x.

automobile is diagramatically shown in FIG. 2. As shown in the FIG. 2, the exhaust system comprises an engine 1, a manifold reactor 2, a double-walled exhaust pipe 3, a premuffler 4, a catalytic converter 5 and a main muffler 6.

FIG. 3 is a perspective view, partially broken away, showing the exhaust double pipe equipped with a flange 7, a bolt hole 8, and an insulating layer 9.

TABLE 1

| No. | water | mono-aluminum phosphate | foamable perlite + ceramic fiber | heat-resisting temperature | vibration-resistance | filling | heat insulating effect | overall appraisal |
|---|---|---|---|---|---|---|---|---|
| 1 | 30 | 30 | 40 | 1250 | ⊚ | ⊚ | ⊚ | ⊚ |
| 2 | 20 | 20 | 60 | 1250 | ⊚ | ⊚ | ⊚ | ⊚ |
| 3 | 40 | 20 | 40 | 1200 | ⊚ | ⊚ | ⊚ | ⊚ |
| 4 | 35 | 35 | 30 | 1250 | ⊚ | ⊚ | ⊚ | ⊚ |
| 5 | 20 | 40 | 40 | 1250 | ⊚ | ⊚ | ⊚ | ⊚ |
| 6 | 10 | 40 | 50 | 1250 | o | x | o | x |
| 7 | 15 | 15 | 70 | 1200 | x | x | o | x |
| 8 | 50 | 10 | 40 | 1150 | x | o | o | x |
| 9 | 60 | 20 | 20 | 1100 | x | ⊚ | x | x |
| 10 | 45 | 45 | 10 | 1050 | x | ⊚ | x | x |
| 11 | 20 | 60 | 20 | 1100 | x | ⊚ | x | x |

On the basis of composition No. 1 in Table 1, the characteristics of various heat-insulating structures which are produced by varying the ratio of foamable perlite to ceramic fiber by weight were tested according to the items in Table 1 and the results are shown in Table 2.

Figure 4:
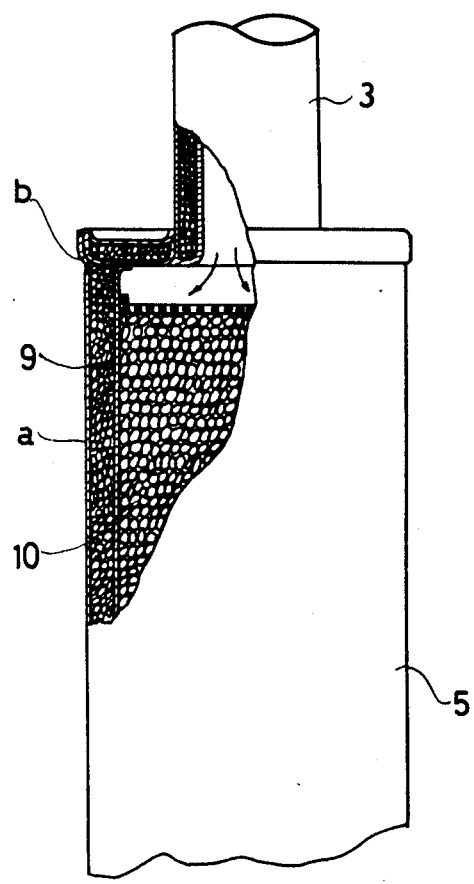
FIG. 4 is a perspective view, partially broken away, of a catalytic converter.

FIG. 4 is a perspective view, partially broken away, showing a catalytic converter wherein a heat-insulating layer 9 and a catalytic filler 10 are shown.

Figure 5:
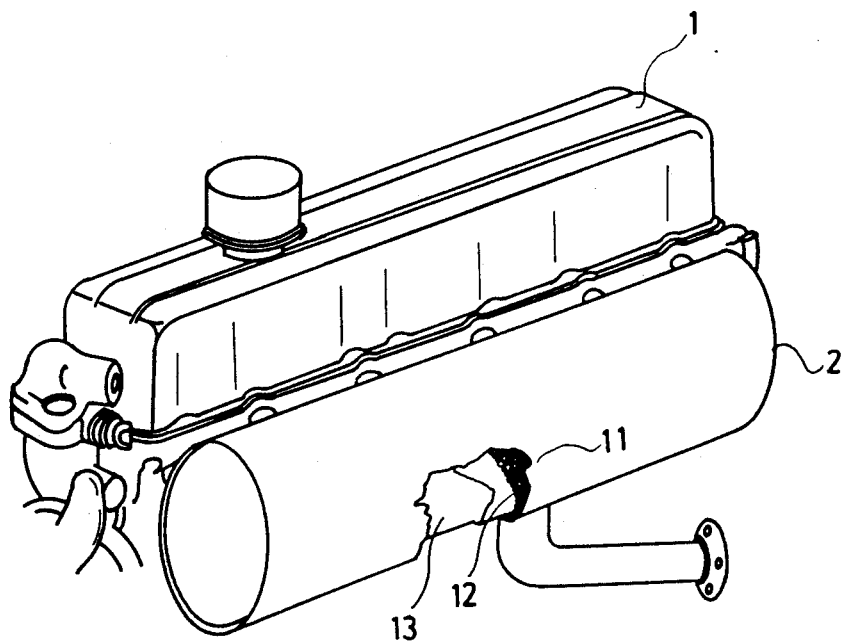
FIG. 5 is a perspective view of a manifold reactor.
Figure 6:
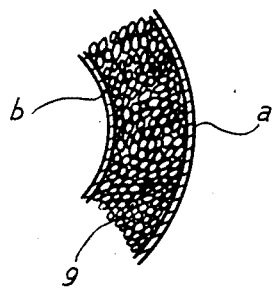
FIG. 6 is a partial cross-sectional view of the manifold reactor of FIG. 5.

FIG. 5 is a perspective view of an engine and a manifold, and FIG. 6 is a cross-sectional view of a portion of a manifold reactor.

TABLE 2

| No. | proportion of ceramic fiber | foamable perlite + ceramic fiber | foamable perlite | ceramic fiber | heat-resisting temperature | vibration-resistance | filling | heat-insulating effect | overall appraisal |
|---|---|---|---|---|---|---|---|---|---|
| 12 | 0 | 40 | 40 | 0 | 1100 | ⊚ | ⊚ | ⊚ | ⊚ |
| 13 | 10 | 40 | 36 | 4 | 1100 | ⊚ | ⊚ | ⊚ | ⊚ |
| 14 | 20 | 40 | 32 | 8 | 1150 | ⊚ | ⊚ | ⊚ | ⊚ |
| 15 | 30 | 40 | 28 | 12 | 1150 | ⊚ | ⊚ | ⊚ | ⊚ |
| 16 | 40 | 40 | 24 | 16 | 1200 | ⊚ | ⊚ | ⊚ | ⊚ |
| 17 | 50 | 40 | 20 | 20 | 1250 | ⊚ | ⊚ | ⊚ | ⊚ |
| 18 | 60 | 40 | 16 | 24 | 1250 | ⊚ | ⊚ | ⊚ | ⊚ |
| 19 | 70 | 40 | 12 | 28 | 1300 | o | ⊚ | ⊚ | o |
| 20 | 80 | 40 | 8 | 32 | 1300 | o | ⊚ | o | o |
| 21 | 90 | 40 | 4 | 36 | 1300 | x | ⊚ | o | x |
| 22 | 100 | 40 | 0 | 40 | 1350 | x | ⊚ | x | x |

The chemical analysis and physical properties of a foamable perlite which was used for the tests of Tables 1 and 2 are shown in Table 3.

TABLE 3

| Chemical analysis | | |
|---|---|---|
| Name of constituent | value of analysis (%) | Physical property |
| $SiO_2$ | 75.5 | Standard density 0.17g/cm³ |
| $Al_2O_3$ | 15.3 | |
| $Fe_2O_3$ | 0.9 | Diameter of Particle 10–3000μ |
| CaO | 0.12 | |
| $K_2O$ | 4.0 | Refractoriness SK 6a |
| $Na_2O$ | 3.5 | |

The composition diagram of a three constituent system shown in the FIG. 1 may be derived from Tables 2 and 3.

The effects of the present invention were confirmed by applying a high-temperature heat-insulating structure according to the present invention to the exhaust system of an automobile. The exhaust system of the In FIGS. 3, 4 and 6, the outer cylinder is designated a and the inner cylinder is designated b.

The effects of the heat-insulating structures according to the present invention will now be explained in detail by way of examples.

EXAMPLE 1

After 210g water has been mixed with 210g monoaluminum phosphate to form a viscous liquid, 85g of Perlite (having the composition given in Table 3, available from Mitsui Kinzoku Kogyo K.K.) and 92g of ceramic fiber (grain size 200 mesh) were introduced into the liquid and stirred so as to produce homogeneity, thereby forming a thin paste. The paste was then introduced into a metal shell which has a space having a diameter of 54mm and a height of 50mm. The cover of the metal shell was then secured by bolts and then the metal was heat-solidified in a furnace at 350°C for an hour and fired in a furnace at an elevated temperature of 650°C for an hour.

In firing, a portion of the sample overflowed from the metal shell through small gaps therein due to expansion. The resultant heat-insulating material or member (bulk density 0.72 g/cm$^3$) was cut into test pieces 20 × 20 × 40mm. 2 types of test pieces were then produced from the above test pieces, one (having a rate of volumetric contraction of 2 – 3%) which was fired in a furnace for 50 consecutive hours at a temperature of 1250°C, and the other (having a rate of volumetric contraction less than 1%) which was fired in a furnace for 150 consecutive hours at a temperature of 1200°C.

Heat impact tests in which the specimens were suddenly heated from room temperature to 1000°C and forcibly air cooled from 1000°C to a room temperature were repeated 1000 times for each specimen. However, no crack was generated. Also, vibration tests for a metal shell containing the fired heat-insulating composition were carried at 90 Hz, at 45G for 5 consecutive hours. No abnormalities resulted.

EXAMPLE 2

After 210g of water had been added to 210g of monoaluminum phosphate to prepare a viscous solution, 2g of an expansion restrainer "Ebit" (an acid corrosion inhibitor, available from Sumitomo Chemical Industry K.K.) was added to the solution in order to prevent spaces from being generated within the heat-insulating member due to expansion. 85g "Perlite" as a foamable perlite, 92g of ceramic fiber, 60g of reaction accelerator "Takibine" (formula $Al_2(OH)_5 \cdot Cl \cdot 2.4H_2O$, available from Taki Seihisho) and 60g of alumina strengthener were also added to the solution and stirred to homogeneity, thus forming a thin paste.

The paste was introduced into the same metal shell in Example 1 and the cover was secured by bolts. The metal shell was then heat-solidified in a furnace at 300°C for 45 minutes and additionally fired for 2 hours at an elevated temperature of 600°C.

The resultant heat-insulating member (bulk density — 0.78 g/cm$^3$) had the same heat-resisting temperature and heat impact resistance as those of Example 1 and has no abnormal expansion, but the solidification time was shortened and the strength of the insulating member is increased.

EXAMPLE 3

The paste of Example 1 was caused to flow through a hole having a diameter of 10mm and filled 95% of a space between the outer and the inner cylinders of the double-walled exhaust pipe (the heat-insulating layer of which is 8mm in thickness) shown in FIG. 3. Any large gaps were eliminated and most holes were closed, gaps through which steam could be released were left. Then, a rigid heat-insulating layer was produced by heat-solidifying the paste in a furnace at 250°C for 20 minutes and firing the paste at an elevated temperature of 550°C for 20 minutes. The resultant double-walled exhaust pipe (bulk density — 0.77 g/cm$^3$) was tested for heat-insulating properties and durability by mounting the pipe on an automobile as shown in the FIG. 2. When the temperature of the exhaust gas which passed through the exhaust pipe was 700°C, the temperature of surface of the outer cylinder was 188°C. Also, after the automobile ran on a bad road for 9,000 km, no deterioration in its heat-insulating properties was found.

After the above test, the exhaust pipe was divided into 5 equal pieces, and the state of each piece was observed. No discoloration or contraction of the heat-insulating product was found. Also, two of the 5 pieces of the exhaust pipe were cut along lengthwise and the extent to which the composition filled the space between the two walls was determined, and found satisfactory.

EXAMPLE 4

A heat insulating layer was prepared in the space between the outer and the inner cylinders of a catalytic converter (see FIG. 4) by filling, heating and firing the paste of Example 1, following the same procedures as in Example 3.

The catalytic converter was filled with a platinum catalyst and mounted on an automobile, and the heat-insulating characteristic and durability were tested. As a result of driving the automobile at an engine rotation of 2,000 r.p.m. the temperature of the catalytic filler was 650°C; however the temperature of the surface of the outer cylinder was 152°C.

Also, after running on a bad road for 13,000 km, a cut test in a similar manner to that of Example 3 was made, but no pulverization, no contraction and no cracks were found.

EXAMPLE 5

The paste of Example 1 was introduced to fill the space between the outer and the inner cylinders of the manifold reactor (see FIG. 5) and was heat-solidified in a furnace at 250°C for 30 minutes, and fired at a temperature of 550°C for 30 minutes. After the formation of a heat-insulating layer, this manifold reactor was mounted on an automobile and its heat insulating characteristic and durability were tested. As a result of driving at an engine rotation of 2500 r.p.m. the temperature of the inner cylinder of the manifold reactor was 1020°C, the temperature of the surface of the manifold reactor was 265°C, the temperature of the gas in the exhaust pipe was 730°C, and the temperature of the surface of the double-walled exhaust pipe was 173°C. The heat-insulating properties of the product were therefore good. Also, after running on a bad road for 15,000 km, the heat-insulating layer was cut and examined in a similar manner to that of Example 3. No pulverization, contraction or cracks were found and the space between the walls was well filled.

EXAMPLE 6

Except that the paste of Example 2 was introduced to fill the space between the outer and the inner cylinders of the manifold reactor, the same procedures as those of Example 5 were followed. After the formation of a heat-insulating layer, this manifold reactor was mounted on an automobile and its heat-insulating properties and durability were tested. As a result of driving at an engine rotation of 2500 r.p.m. the temperature of the inner cylinder of the manifold reactor was 990°C, the temperature of surface of the manifold reactor was 243°C, the temperature of the gas in the double-walled exhaust pipe was 723°C, and the temperature of the surface of the double-walled exhaust pipe was 193°C, and the heat-insulating properties were therefore good. Also, after running on a bad road for 7,000 km, the heat-insulating layer was cut and examined in a manner similar to that of Example 3. No pulverization, contraction or cracks were found and the space between the walls was well filled.

As a result of the above tests, it will be apparent that this invention has the following advantages. Firstly, since the heat-insulating layer according to this invention is formed by expanding a heat-insulating composition, compressed inner stresses are generated within the layer and its vibration-resisting characteristic is significantly increased. The heat-insulating effect is also higher, as compared with a conventional one. In particular, the material according to this invention is capable of shielding a high manifold reactor since the temperature drop through it is above 1000°C.

Secondly, since when forming the heat-insulating layer according to the present invention, the paste is introduced by means of flowing, pressure or suction, the operation is simple. Also, since, even if the configuration is complicated or the space is small, filling can be effected, the articles in accordance with the present invention can be manufactured at a fourth to a fifth of the cost of a conventional one.

What is claimed is:

1. A method of making a heat-insulating structure which comprises the steps of introducing into a casing an aqueous slurry having 60–80% solids content consisting essentially of monoaluminum phosphate, foamable perlite and ceramic fibers, with the monoaluminum phosphate constituting from about 20% to about 40% by weight of the slurry and the foamable perlite and ceramic fibers constituting a total of from about 30% to about 60% by weight of the slurry, and firing said slurry within the casing.

2. A method as claimed in claim 1 in which said slurry is heated within said casing at about 250°C ~ 350°C for more than 20 minutes followed by heating at about 550°C ~ 650°C for more than 20 minutes.

3. A method as claimed in claim 1 in which said slurry comprises substantially equal parts of water and monoaluminum phosphate by weight.

4. A heat-insulating structure made by the method of claim 1.

5. A heat insulating structure as claimed in claim 4 in which said casing is defined by the inner and outer walls of a double-walled component of an automotive exhaust system.

6. A method of making a heat-insulating structure which comprises the steps of introducing into a casing an aqueous slurry containing water, aluminum phosphate and a mixture of foamable perlite and ceramic fiber in proportions represented by the shaded area in FIG. 1 of the accompanying drawings.

7. A heat-insulating structure made by the method of claim 6.

8. A heat-insulating structure comprising a casing filled with a fired ceramic consisting essentially of aluminum phosphate, foamed perlite and ceramic fibers, with said aluminum phosphate constituting at least 25% by weight of the ceramic.

* * * * *